United States Patent [19]

Osborne

[11] Patent Number: 4,922,268

[45] Date of Patent: May 1, 1990

[54] PIEZOELECTRIC DETECTOR FOR DROP POSITION DETERMINATION IN MULTI-PEN THERMAL INK JET PEN PRINTING SYSTEMS

[75] Inventor: William S. Osborne, San Diego, Calif.

[73] Assignee: Hewlett-Packard Company, Palo Alto, Calif.

[21] Appl. No.: 304,544

[22] Filed: Jan. 31, 1989

[51] Int. Cl.[5] .......................... G01D 18/00; B41J 3/04

[52] U.S. Cl. ................................ 346/140 R; 310/339; 310/800

[58] Field of Search ................. 346/140, 1.1; 310/800, 310/339

[56] References Cited

U.S. PATENT DOCUMENTS

| | | | |
|---|---|---|---|
| 4,067,019 | 1/1978 | Fleischer | 346/75 |
| 4,323,905 | 4/1982 | Reitberger | 346/75 |
| 4,509,057 | 4/1985 | Sohl | 346/140 X |
| 4,709,244 | 11/1987 | Piatt | 346/140 |
| 4,791,435 | 12/1988 | Smith | 346/140 |
| 4,835,435 | 5/1989 | Yeung | 346/140 X |

*Primary Examiner*—Joseph W. Hartary
*Attorney, Agent, or Firm*—Roland I. Griffin

[57] ABSTRACT

Apparatus for determining inter-pen offsets in a multiple pen ink jet printer including a piezoelectric ink drop detector having a piezoelectric detector film having one or more openings formed therein. A carriage position sensor indicates the position of the carriage at the time a first ink drop is detected from each of the ink jet pens as the pens are scanned across an opening, whereby the sensed positions for the respective pens provides information indicative of inter-pen offset in the scan direction. For determination of inter-pen offset in the media scan direction, the piezoelectric film includes a plurality of openings, whereby the detect/no detect patterns for each of the pens provides information indicative of the inter-pen offsets.

5 Claims, 2 Drawing Sheets

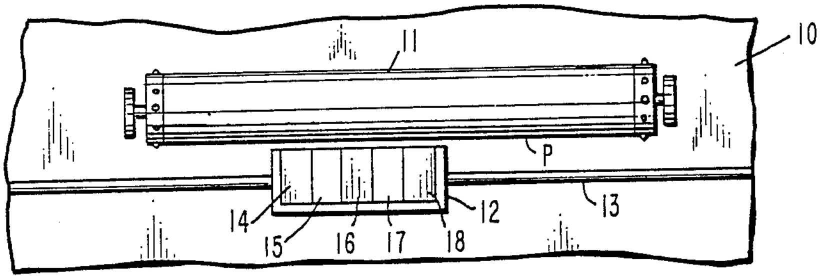
Fig. 1.
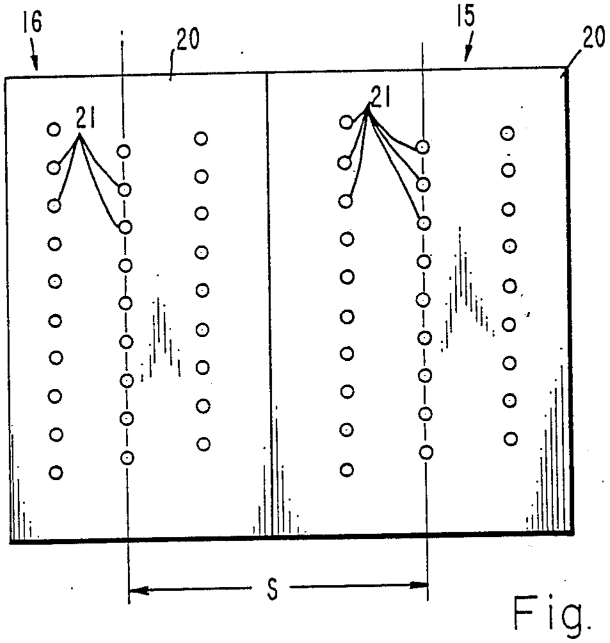
Fig. 2.
Fig. 3.
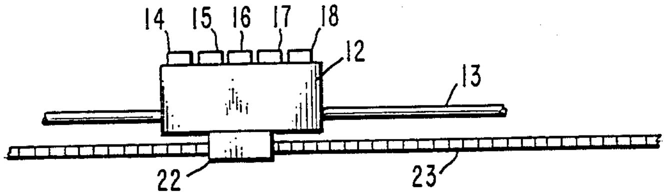

PIEZOELECTRIC DETECTOR FOR DROP POSITION DETERMINATION IN MULTI-PEN THERMAL INK JET PEN PRINTING SYSTEMS

BACKGROUND OF THE INVENTION

The present invention relates to ink jet printing apparatus employing a plurality of printing modules. More particularly, the invention relates to calibrating the distance between pens in the pen scan direction (Y), and calibrating the displacement of nozzle arrays relative to each other in the print media index axis (X).

The design of color ink jet printers is described in the August 1988 issue of the Hewlett-Packard Journal.

The following U.S. Pat. Nos. disclose ink jet printing technology: 4,709,245, M. J. Piatt, "Ink Jet Printer for Cooperatively Printing with a Plurality of Insertable Print/Cartridges"; 4,709,246, M. J. Piatt et al., "Adjustable Print/Cartridge Ink Jet Printer"; 4,709,247, M. J. Piatt et al., "High Resolution, Print/Cartridge Ink Jet Printer"; 4,709,248, M. J. Piatt et al., "Transverse Printing Control System for Multiple Print/Cartridge Printer"; all issued Nov. 24, 1987.

SUMMARY OF THE INVENTION

Commonly assigned and concurrently filed U.S. patent application Ser. No. 07/304,980, entitled, "Inter Pen Offset Determination and Compensation in Multi-Pen Thermal Ink Jet Pen Printing Systems," by Cobbs et al., describes a highly useful invention for calibrating the distance between pens in the pen scan direction (Y), and calibrating the displacement of nozzle arrays relative to each other in the print media index axis (X).

In general, that invention employs an optical drop detector and a separate aperture plate with an opening having teeth disposed in a vernier comb-like pattern. The present invention provides inter-pen offset determination and compensation by means of a novel arrangement employing a piezoelectric drop detector provided with a punched hole pattern therein. The arrangement of the present invention has the advantages of simplicity and low cost when used in place of the optical drop detector and separate aperture plate.

In accordance with the present invention, there is provided a color alignment system for multiple pen thermal ink jet printing systems having a capability to measure tolerance-related dot placement error. This capability allows application of a correction algorithm to the drop fire timing and image data such that the highest possible quality image is produced. In the pen scan axis the pen carriage is driven at a constant velocity by means of servo control while one of the pens is firing at a constant frequency. The ink drops initially pass through an opening provided in a piezoelectric film and are not detected. When the drop stream hits the piezoelectric film at the edge of the opening, the impact causes a piezoelectric charge to be developed. At the instant of drop detect, the carriage position is read. Comparison of the position of the carriage for all pens at the instant of first drop detect provides the inter pen spacings, or distance between the pens in the pen scan direction (Y).

The displacement of nozzle arrays in the index axis direction (X) is measured by successively positioning each pen adjacent a special pattern of openings provided in the piezoelectric film and firing ink drops through the nozzle array to locate the nozzle pattern. Multiple tests per pen may be taken in one carriage pass. This operation is repeated for each pen in the carriage.

Some of the drops impact the piezoelectric film and are detected. Others pass through the special pattern of openings and are not detected by the piezoelectric drop detector. This information is mapped into the known position of each nozzle to create a pattern of detect/no detect for each of the pens. The patterns are then compared to determine relative offsets between the pens.

The algorithm for the calibration of the distance between pens in the pen scan direction, and the calibration of the displacement of the nozzle arrays in the print media index direction is employed as a correction algorithm to electronically compensate the drop fire timing and image data. This enables the multi-pen thermal ink jet printer of the present invention to accurately overlay the primary color dots, thus resulting in a high quality image being produced.

If desired, a combined wick and wiper may be provided to remove ink from the piezoelectric film by means of non-contact wicking/wiping action that conducts the ink to an absorbent collector.

BRIEF DESCRIPTION OF DRAWINGS

The foregoing and other features of the present invention can be more readily understood with reference to the following detailed description, taken in conjunction with the accompanying drawings, wherein like reference designate like structural elements, and in which:

FIG. 1 is a plan view of a portion of a thermal ink jet printer constructed in accordance with the present invention, shown broken away to illustrate the interior thereof;

FIG. 2 shows an elevation view of adjacent orifice plates greatly magnified illustrating the inter-pen spacing between nozzle arrays;

FIG. 3 is an elevation view of the pen carriage showing the integral linear position encoder and its associated code strip;

DETAILED DESCRIPTION

Figure 4:
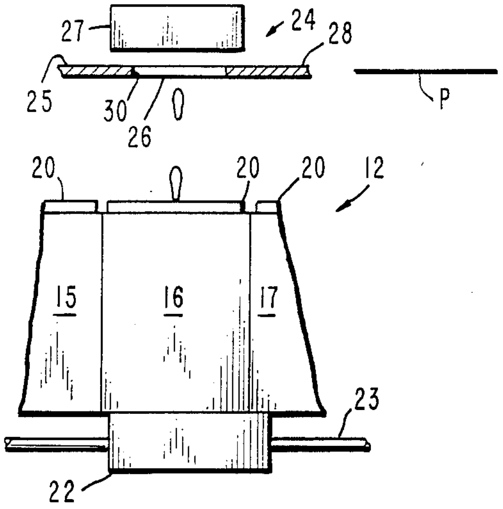
FIG. 4 is a plan view showing a pen firing ink drops toward a piezoelectric drop detector having an opening therein.

Referring now to FIG. 1, there is shown a plan view of a thermal ink jet printer 10. The printer 10 is shown broken away, and in the interior thereof there may be seen a roll or platen 11 for carrying and indexing the print media, which may be paper, overhead transparency film, or the like. A carriage 12 is mounted for movement back and forth adjacent the print zone P of the platen 11 along a guide rail 13. Mounted within the carriage 12 are five disposable print cartrides or pens 14, 15, 16, 17 and 18. There is no fixed order for the pens 14–18, but for purposes of description, it will be assumed that by way of example, pen 14 prints the color cyan, pen 15 magenta, pen 16 yellow, and pens 17 and 18 print black, although only one black pen 17 may be used, if desired. All five pens 14–18 are thermal ink jet pens employing heating of a thin-film resistor to fire a drop of ink. This technology works on the principle of drop on demand. Each pen 14–18 has a plurality of nozzles 21 (FIG. 2), and each nozzle 21 can supply a drop of ink on demand as the pen carriage 12 scans across the print media carried by the platen 11.

FIG. 2 shows an elevation view of adjacent orifice plates 20, greatly magnified, which form a part of the pens 14–18. The orifice plates 20 are shown with thirty nozzles 21 for convenience of description, although the actual number of nozzles 21 may be more or less than 30, if desired. Furthermore, the orifice plates 20 may have a different configuration than that shown, for example, long and narrow with the nozzles 21 in two rows instead of three.

This multi-pen printer 10 of the present invention has the advantage of providing faster printing speeds and more pages between replacement of disposable print cartrides or pens 14–18. The printer 10 of the present invention which employs a separate pen for each of the primary colors (pens 14, 15, 16), plus separate black pens (pens 17 and 18), has a print quality which is equal to or better than prior art printers which provide the three primary colors on a single pen.

It has been found that there exists a strong correlation between the alignment of the primary color dots and the quality of the resulting image. In the multi-pen printer of the present invention, the ability to accurately overlay the primary color dots is dependent on manufacturing tolerances in both the pens and the printer. Rather than reduce these tolerances by refining the manufacturing processes, the printer of the present invention is provided with the capability to measure tolerance-related dot placement errors. This capability allows application of a correction algorithm to the drop fire timing and image data such that the highest possible quality image is produced.

To calibrate the pens 14–18, there is provided a linear encoder 22, shown in FIGS. 3 and 4. The linear encoder 22 is a high resolution carriage position sensor with quadrature outputs, the resolution being increased by interpolating between quadrature states. The linear encoder 22 is integral to the pen carriage 12 and provides a constant output of position of the carriage 12 as the pens 14–18 are scanned back and forth along the guide rail 13.

Referring to FIG. 3, the linear encoder 22 which is integral to the carriage 12 employs as a reference a code strip 23. The code strip 23 is a long strip of duPont brand Mylar material, for example, provided with a marking of opaque lines, which may be photographically produced. Typically, the code strip 23 may have on the order of 150 lines per inch. The linear encoder 22 may be a linear optical incremental encoder module, such as model HEDS-9200 manufactured by the Optoelectronics Division of Hewlett-Packard Company. A quadrature output of typically 600 to 800 counts per inch is used to operate the motion control system. The reference signal for positioning of ink drops on the print media is generated from a single channel of the encoder 22. This eliminates any possible problem with phase errors in the encoder 22.

In prior art devices the position of the orifice plate is detected to determine distance between pens in the pen scan direction (Y). In the present invention the position of a drop of ink in the nominal plane of the print media is detected.

In FIG. 4 there is shown a plan view of the arrangement for determining distance between pens in the pen scan direction (Y). To one side of the print zone (P), a drop detector 24 is placed in the nominal plane of the print media. The drop detector 24 comprises a strip of piezoelectric film 25 which is freely suspended or mounted as a diaphragm to the base of the printer 10. The film 25 is located to be coplanar with the print zone P. The piezoelectric film 25 may be film sold under the trade name KYNAR, or the like. The piezoelectric film 25 is provided with an opening 26. Behind the opening 26 there is disposed an absorbent ink collector 27. An electrical connection 28 conducts any electric charge developed by the piezoelectric film 25 to an amplifier and microprocessor electronics (not shown).

While the carriage 12 is moving at a constant velocity from righ to left, one of the pens 14–18 is fired continuously at the rate of 2000 or more drops per second. Firing of ink drops begins at a position such that the drops initially pass through the opening 26 and are collected in the absorbent ink collector 27. When the drop stream hits the edge 30 of the opening 26, it impacts a portion of the piezoelectric film 25, causing an electric charge to be developed. At the instant of first drop detect, the encoder 22 integral with the carriage 12 is read. Similarly, a reading is obtained for each of the remaining pens 14–18. Since the carriage 12 travels at a constant velocity and the pens 14–18 are fired, in turn, at a constant frequency, the distance between the pens 14–18 in the pen scan direction (Y) is easily determined. Comparison of the carriage positions for all pens 14–18 provides the inter-pen spacings.

The resolution of the linear encoder 22 is increased by interpolating between pulses. The measurement of the inter-pen distance or spacing (S) involves two problems. The carriage 12 is moved at a constant velocity controlled by a servo via the linear encoder 22 and the code strip 23. The first problem in the measurement of inter-pen spacing (S) is that the very slow speed at which the drop detection must be performed (typically on the order of 0.625 to 0.833 inches per second) necessitates a special servo system configuration. The resolution of the linear encoder 22 is such that one encoder count will be traversed in two milliseconds. The high quality velocity feedback needed for stabilizing the servo loop can be obtained despite the quantization of the encoder feedback by timing between encoder counts.

The second problem is that the resolution of the measurement that is needed is greater than the 0.00125 inch quantization level of the linear encoder 22. This problem is solved by interpolating between encoder counts by means of time measurements. The time elapsed between encoder counts is available from the timing based servo previously described. An additional timer provides the time elapsed from the last encoder count until drop detection is indicated by the drop detector 24. The ratio of these times can be used to interpolate the position of the carriage12 at the time of the drop detection. Comparison of the positions of the carriage 12 for all pens 14–18 provides the inter-pen spacing (S). Actual test results have shown that position measurements of 0.0004 inch or better are obtained.

This measurement of the inter-pen spacings S is performed automatically to one side of the print zone P, and the result of the measurement is converted to a correction algorithm to electronically compensate the drop fire timing and image data. This enables the multipen thermal ink jet printer 10 of the present invention to accurately overlay the primary color dots, thus resulting in a high quality image being produced.

Figure 5:
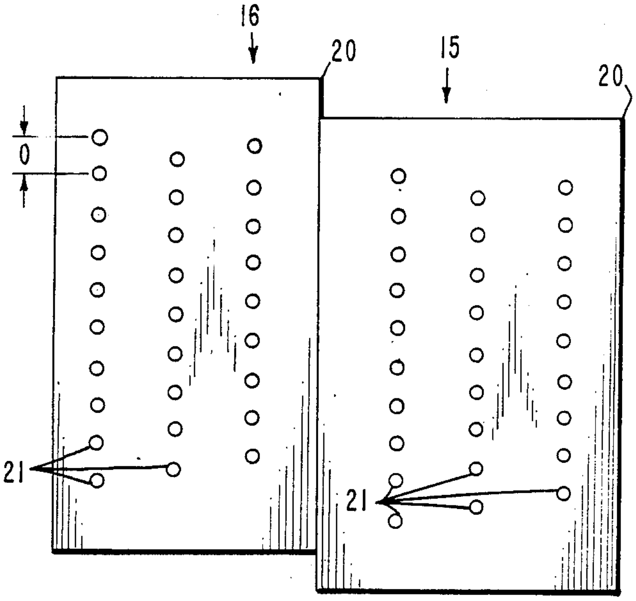
FIG. 5 is an elevation view of adjacent orifice plates greatly magnified illustrating the offset between nozzle arrays.

As is well known, the cartridges or pens 14–18 are replaceable and are held in place by a latch mechanism and by mechanical registration surfaces. The repeatability of registration of the pens 14–18 to the carriage 12 directly affects the print quality. The body of the print cartridges or pens 14–18 has some uncertainty in dimension. Discrepancies in alignment of the pens 14–18 may result in offsets (O) or displacements of nozzle arrays relative to each other in the print media index axis (X) as shown in FIG. 5.

Figure 6:
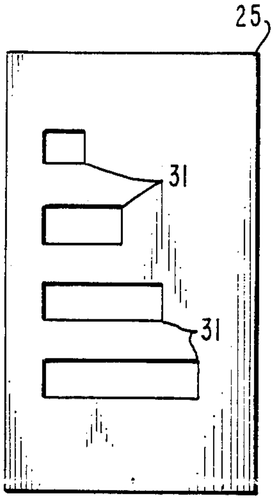
FIG. 6 is an elevation view greatly magnified of a piezoelectric film having a special pattern of openings therein for calibrating pen offsets.

X-axis measurements are made by successively positioning each one of the pens 14–18 adjacent a special pattern 31 of openings provided in the piezoelectric film 25 and firing ink drops through the nozzle array to locate the nozzle pattern. Multiple tests per pen may be taken in one carriage pass. This operation is repeated for each of the pens 14–18 in the carriage 12. The special pattern 31 of punched openings is shown in FIG. 6, where it may be seen that the openings are rectangular and of varying lengths and arranged side-by-side in a stair-step pattern.

Some of the drops impact the piezoelectric film 25 and are detected. Others pass through the special pattern 31 of openings and are not detected. This information is mapped into the known position of each nozzle 21 to create a detect/no detect pattern for each of the pens 14–18. The patterns are then compared to determine relative offsets from pen-to-pen. If two of the pens 14–18 are determined to be out of alignment by more than one-half a dot row, the image data is shifted up or down in the nozzle arrays to produce the optimum alignment. Note that by doing so, nozzles 21 at the ends of the arrays may have to be sacrificed. That is, they will not be usable.

The algorithm is a detect/no detect pattern generated from each of the pens 14–18 to determine relative pen-to-pen offsets O. This algorithm for the pen alignment in the print media index axis (X) is employed as a correction algorithm to electrronically compensate the drop fire timing and image data. This enables the multi-pen thermal ink jet printer 10 of the present invention to accurately overlay the primary color dots, thus resulting in a high quality image being produced.

Thus, there has been described inter-pen offset determination and compensation in multi-pen thermal ink jet pen printing systems. It will be seen that the printer of the present invention measures drop location data in the nominal plane of the print media rather than at the orifice plate. It will be seen that the printer of the present invention detects drop position both in X and Y axes, not in just one axis. Also, it will be seen that the printer of the present invention compensates for directionality errors because it measures drop position in the nominal plane of the print media.

It is to be understood that the above-described embodiment of the invention is merely illustrative of the many possible specific embodiments which represent applications of the principles of the present invention. Numerous and varied other arrangements can be readily devised in accordance with these principles by those skilled in the art without departing from the scope of the invention.

What is claimed is:

1. A multi-pen color printer (10) having provisions for accurately overlaying primary color dots to form a high quality image, said printer comprising:

(a) carriage means (12) for scanning along a print zone in a scan direction;

(b) a plurality of color pens (14–18) carried by said carriage means (12) and being adapted to fire drops of ink on demand;

(c) linear encoder means (22) integral with said carriage means (12) and cooperatively coupled to code strip means to measure the position of said carriage means (12) as it scans in the scan direction;

(d) piezoelectric detector means (24,25) for detecting the impact of a drop of ink and being disposed in a coplanar relationship with said print zone;

(e) an opening in said piezoelectric detector means (24,25) such that ink drops pass therethrough and are not detected until said carriage means scans beyond said opening;

(f) a pattern of openings (31) provided in said piezoelectric detector means (24,25) for mapping the position of nozzles for each of said pens (14–18);

(g) the detect/no detect measurement of drops impacting and not impacting said piezoelectric drop detector means (24,25) providing measurement of spacing between pens (14–18) in the pen scan direction;

(h) the mapped position of nozzles with respect to the pattern of openings in said piezoelectric drop detector means (24,25) providing a measurement of offset between arrays of nozzles in said pens (14–18) in a print media index axis; and (i) the measurements of spacing and offset providing a correction algorithm to electronically compensate the drop fire timing and image data in said multi-pen color printer (10).

2. Apparatus for providing inter-pen offset determination in a thermal jet printer having multiple ink jet pens, comprising:

(a) carriage means for scanning along a print zone in a scan direction;

(b) a plurality of pens carried by said carriage means and being adapted to fire drops of ink on demand;

(c) position sensing means for indicating the position of said carriage means as it scans in the scan direction;

(d) piezoelectric detector means having a piezoelectric film for detecting the impact of a drop of ink and being disposed in a coplanar relationship with said print zone;

(e) an opening in said piezoelectric detector means such that ink drops pass therethrough and are not detected until said carriage means scans beyond said opening;

(f) the detect/no detect measurement of drops impacting and not impacting said piezoelectric drop detector means, as the carriage means scans, providing measurement of spacing between pens in the pen scan direction.

3. Apparatus for providing inter-pen offset determination in a thermal jet printer having multiple ink jet pens, comprising:

piezoelectric detector means having a piezoelectric film for detecting the impact of a drop of ink and being disposed in a coplanar relationship with a print zone;

a pattern of openings provided in said piezoelectric film;

the mapped position of nozzles with respect to the pattern of openings in said piezoelectric detector means providing a measurement of offset between the ink jet pens.

4. Apparatus for providing inter-pen offset determination in a thermal jet printer having multiple ink jet pens supported in a movable carriage, comprising:

piezoelectric detector means having a piezoelectric film for detecting the impact of a drop of ink and being disposed in a coplanar relationship with a print zone;

an aperture formed in said piezoelectric film;

means for scanning the carriage in a scan direction so that the pens scan across said aperture; and carriage position sensing means for indicating the position of said carriage at the time a first ink drop is detected from each of the ink jet pens as the pens are scanned across said opening, whereby the carriage positions for the respective pens provides information indicative of the inter-pen offsets between pens in the scan direction.

5. Apparatus for providing inter-pen offset determination in a thermal jet printer having multiple ink jet pens, comprising:

piezoelectric detector means having a piezoelectric film for detecting the impact of a drop of ink and being disposed in a coplanar relationship with a print zone; and a precision hole pattern formed in said piezoelectric film, whereby the respective detect/no detect patterns for each of the pens provides information indicative of the inter-pen offsets between respective pens.

* * * * *